Dec. 9, 1969 W. G. CREGEEN 3,483,333

TELEPHONE SUBSCRIBER SET

Filed April 20, 1966

INVENTOR
WILLIAM G. CREGEEN
BY
[signature]
ATTORNEY

United States Patent Office 3,483,333

Patented Dec. 9, 1969

3,483,333

TELEPHONE SUBSCRIBER SET

William George Cregeen, Corinth, Miss., assignor to International Telephone and Telegraph Corporation Filed Apr. 20, 1966, Ser. No. 543,922
Int. Cl. H04m *1/02*
U.S. Cl. 179—100 9 Claims

ABSTRACT OF THE DISCLOSURE

A telephone subscriber set having a base wherein the lower portion of the housing is elevated upward at the front of the base. A horizontally disposed slot is provided in this elevated region to provide a handhold.

This invention relates to telephone subscriber sets and more particularly, to the base unit for such subscriber sets.

Generally speaking, the term "telephone subscriber set" describes the combination of a base and a handset normally found at the home or office of a telephone subscriber. The base comprises a casing enclosing at least some of the circuitry located at the subscriber station. The circuitry may include a subscriber signalling device such as a tone sounder or ringer, the dial or push button tone selection keys, and a hookswitch with contacts for indicating the availability condition of the set (i.e. busy, idle, or demanding service). The casing covers and protects the aforementioned circuitry and provides a cradle for receiving and supporting the handset. The casing also supports and displays the dial, keys, and the like. Among other things, it is important that the casing design should take into account the physometric needs of the human operator. Thus, the handset should be mounted where it is easy to pick up or replace. The dial should be out where it is easy to manipulate.

To provide for the human factors, these casings are generally equipped or formed to have a handhold for enabling the lifting and moving of the telephone set by the subscriber. In the past, these handholds have been in the back of the casing and generally beneath the handset. When the handhold is so located beneath the handset, it is sometimes possible to dislodge the handset or accidentally actuate the pushbuttons when reaching for the handhold or moving the telephone. The likelihood of dislodging the handset or inadvertently actuating a key increases when the telephone set is located slightly further than an arms length away from the user, and it is necessary for the user to stretch unduly to reach the telephone.

On occasions, telephone sets may rest under shelves or other objects so that it is difficult or impossible to reach the handhold beneath the handset. For example, the telephone set could rest on a counter when in use and be slid back under a shelf when not in use.

For these and other reasons apparent to telephone users, the handholds used in the past have not always been the most satisfactory from the standpoint of physometric engineering.

Accordingly, an object of the present invention is to provide a handhold on a telephone subscriber set which provides physometric advantages not found heretofore. In particular, an object is to provide a handhold on the front of the casing, which is part of the telephone base. Yet another object is to provide a handhold which meets the desired physometric requirements in an aesthetic manner. In this connection, an object is to provide a handhold which is not immediately discernible to the user, but is easily accessible.

A further object of the present invention is to provide a handhold at the front of the subscriber set base.

A still further object of the present invention is to provide a front handhold for telephone set bases which enables the user to simultaneously move the telephone and actuate a circuit control device with one hand while the telephone is being moved while precluding a faulty and unwanted actuation of such control device.

According to one embodiment of this invention, these and other objects of the invention are accomplished by providing a telephone subscriber set having a base wherein the lower portion of the housing is elevated upward at the front of the base. The elevation is sufficient to enable a user to comfortably place the finger tips of his palm-up hand under the housing with the fingers in a somewhat curled or slightly bent position. A horizontally disposed slot is provided in the elevated region of the lower portion of the housing. The frontmost section of the slot extends downwardly to enable the user to catch that section when he places his fingers into the slot and pulls. This way, he can slide the telephone forward toward himself. Likewise the back of the slot engages the finger tips, thereby allowing him to push the telephone away from himself.

The above mentioned and other features and objects of this invention and the manner of obtaining them will best be understood by referring to the following description of embodiments of the invention taken in conjunction with the accompanying drawings wherein.

Figures 1, 2, 3:
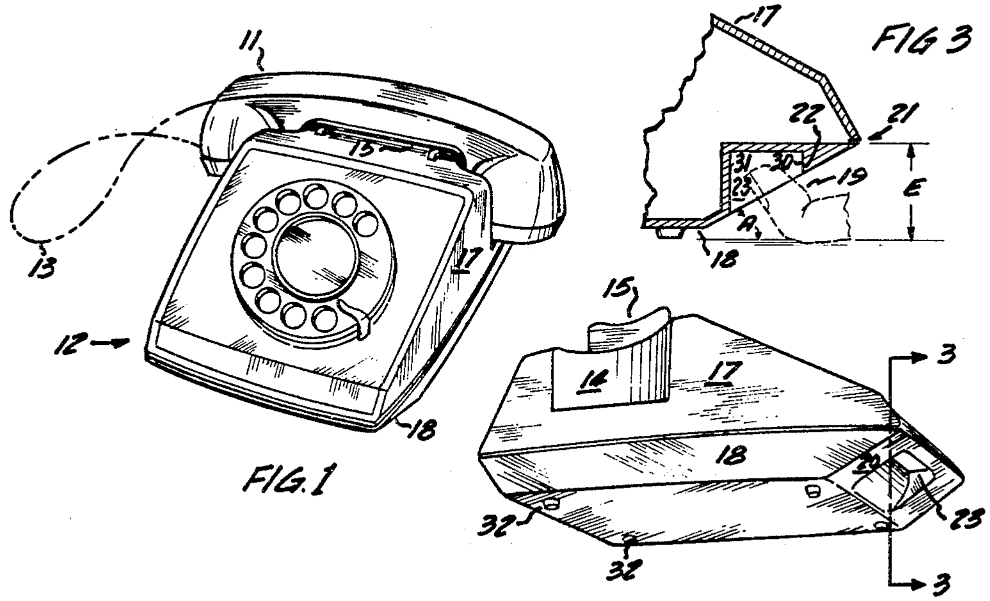
FIG. 1 is a perspective view of a telephone having a rotary dial and showing that the invention handhold is aesthetically concealed beneath an upwardly slanting portion on the lower half of a telephone set.
FIG. 2 is a perspective view of the telephone subscriber set of FIG. 1 showing the lower half which includes the handhold.
FIG. 3 is a cross-sectional view of the handhold taken along the sectional line 3—3 of FIG. 2.

The subscriber telephone set shown in FIG 1 comprises a handset 11 connected to the base 12 of the telephone set by a cord 13 schematically indicated by a dot-dashed line showing.

Means are provided for holding the handset in a cradled position on the base when the telephone is not in use. In greater detail, this means is here shown as a pair of semicylindrical wells 14 (best seen in FIG. 2). The cylindrical wells 14 are of sufficient vertical depth and lateral width to receive and nestingly support the two ends of a handset. The relative dimensions prevent the handset from falling out of the wells even when the base is tilted or rocked at relatively large angles with respect to the horizontal.

It has been found that the well captivates the handset best when the vertical depth of the wells is great enough so that the handset does not rest on the bottom of the wells 14 when in the cradled position. Instead, the handset is supported almost entirely by two hookswitch levers 15 having a generally concave upper surface for guiding the handset to a position of a minimum center of gravity.

To facilitate manufacture at the lowest cost, the housing 12 is preferably made from two molded plastic pieceparts 17, 18. The upper piece part 17 provides the functions of supporting a handset, enclosing the telephone components and presenting an aesthetically pleasing appearance to the user. The lower piece 18 provides a somewhat tray shape performing the functions of supporting and locating the various components. The lower edge of upper part 17 and the upper edge of the lower part 18 have the same general contours so that the two halves may be bolted together to make a completely enclosed housing.

The front lip of the lower portion of the housing 18 is elevated by a distance E selected on a physometric basis to allow the user to place his fingers under the housing in a somewhat curled or slightly bent position. For example, dot-dashed lines 19 show a subscriber's fingers in such a position.

Means are provided in the lower face of the telephone set base to enable a user to firmly grasp the subset and move it primarily—although not exclusively—in a sliding motion. In greater detail, the front face 20 of the lower portion 18 slants upward at an angle A toward the junction 21 between the upper and lower housing parts 17, 18. With the present day telephone equipment, the physiometric needs are well served when the angle A is in the general range of 30°–45° and the elevation E is in the nature of one inch. This way, the user may insert his hand palm up, with the tips of the fingers between the base 18 and a desk or other surface on which the telephone rests. The sloping face of the lower piece part 18 has a handhold molded therein. In this particular embodiment the handhold is shown as a horizontally disposed slot; however, it could just as well be a projecting bar, lip, post, or the like. The natural curl of fingers when the hand is in a palm-up position easily engages the handhold to manipulate the telephone as by pulling against the edge 22 of a slot 23, for example.

The base 12 is normally supported by feet 19 which may take any suitable form, such as rubber washer or pads. The slot 23 in the elevated, sloping portion of the lower part 18 comprises front and back walls 30, 31 which are preferably set slightly off the perpendicular to the surface formed by the bottom portions of feet 19. The dimensions and form are selected to assure room for the finger tips in the slot. The back wall acts to direct the fingers upward toward the front wall where they catch the overhang 30 of the slot 23.

The slot 23 is intended to supplement, not replace the normal handhold usually located beneath the handset. Thus, the invention does not eliminate any of the conveniences normally provided for the subscriber. However, there are times when it is awkward to reach the handhold under the handset, as when the telephone is resting under a self or other object. Therefore, in use, a subscriber desiring to move the inventive telephone set does not have to reach over the handset to move the set into a convenient position. Thus, there is no danger of jabbing the tone selection pushbutton dialler or knocking the handset off the base. The subscriber merely turns the hand palm up and reaches under the sloping front face on the lower half of the housing 18 and hooks his finger into the slot 23. He catches his fingers and pulls on the wall overhang 30 or pushes on back wall 31 and easily slides the telephone set to a desired location. Even if the telephone set is tilted upward or rocked from side to side during the move, the handset is secure in position in the well walls 14.

Figure 4:
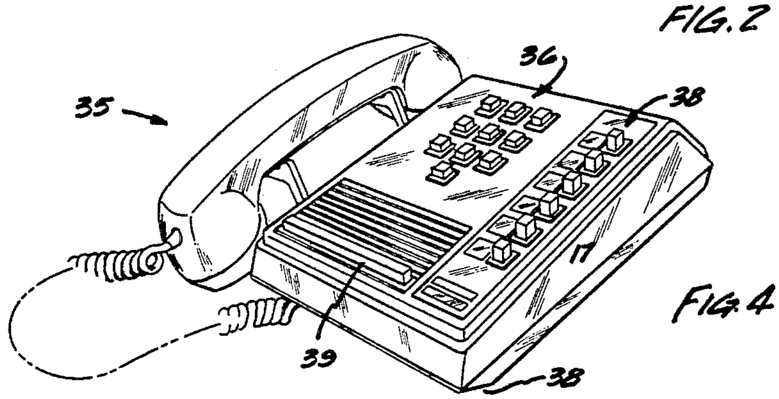
FIG. 4 is a perspective view of a key dialing, hands-free or speaker type, telephone set including the invention again showing the aesthetically pleasing manner in which the handhold is concealed.
Figure 5:
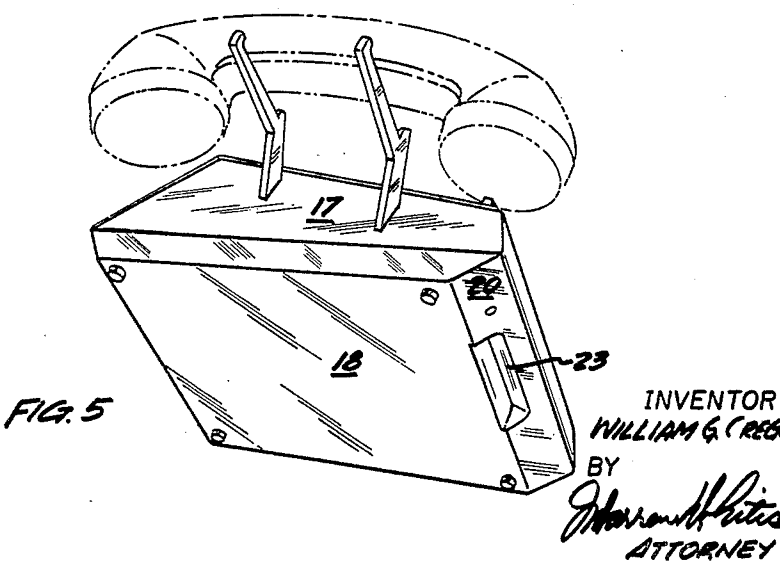
FIG. 5 is a perspective view of the lower half of the subscriber telephone set of FIG. 4 showing the handhold.

The telephone set shown in FIG. 4 illustrates a further advantage and other features of the inventive telephone set. In greater detail, FIGS. 4 and 5 show a telephone set adapted to function as a handsfree speaker type telephone set or as one having space for added keys.

As best shown in FIG. 4, the telephone set 35 uses keys 36 for tone dialing. In addition, multiline, intercom or other service is provided by a plurality of keys 38. A further elongated key or bar 39 is used to control the telephone operation. For example, a subscriber may transform the telephone into a handsfree speaker phone by pushing the key 39. The key 39 is shown as positioned above the slot 23 so that it may be operated by the thumb while the finger tips catch slot 23. Otherwise, the telephone set of FIGS. 4 and 5 is essentially the same as that of FIGS. 1–3. It has the same upper and lower halves 17, 18 with the bottom surface that supports the telephone. The front portion 20 of the lower half is elevated by slanting upwardly to enable the user to insert his fingers into slot 23. Again the upward slant conceals the handhold from sight when the telephone is viewed from a normal user position, thereby giving a good aesthetic appearance.

The subscriber may use the slot to grasp the set while moving it to a more convenient position. Again, the location of the slot 23 enables the user to maneuver the telephone with no danger of inadvertently actuating any of the keys or the control bar 39. In addition, the speaker phone control bar can be readily manipulated with the thumb of the same hand that is used for moving the phone, and the manipulation can be accomplished during the positioning of the telephone, if the subscriber chooses to do so.

While the principles of the invention have been described above in connection with specific apparatus and applications, it is to be understood that this description is made by way of example, and not as a limitation on the scope of the invention.

I claim:

1. A telephone subscriber set having a base with an elevated lower portion, said elevation being positioned to face a subscriber when the telephone set is in normal use, said elevation being sufficient to allow said subscriber to place his finger tips under said housing and handhold means under said elevated portion positioned to engage the finger tips when so placed and thereby facilitate movement of said telephone, said handhold means comprises an elongated horizontally disposed slot opening downwardly an extending upwardly from said opening, the front edge of said slot comprising an overhang which can be caught and pulled by the finger tips when the fingers are slightly bent, and the back edge of said slot comprising a wall which can be pushed by said finger tips.

2. A telephone subscriber set having a base with an elevated lower portion, said elevation being positioned to face a subscriber when the telephone set is in normal use, said elevation being sufficient to allow said subscriber to place his finger tips under said housing, and handhold means under said elevated portion positioned to engage the finger tips when so placed and thereby facilitate movement of said telephone, said base has contours which generally conceal the handhold from sight when said base is viewed from the position of a subscriber who is making a normal usage of the telephone.

3. A telephone subscriber set having a base with an elevated lower portion, said elevation being positioned to face a subscriber when the telephone set is in normal use, said elevation being sufficient to allow said subscriber to place his finger tips under said housing, and handhold means under said elevated portion positioned to engage the finger tips when so placed and thereby facilitate movement of said telephone, said base is made from upper and lower parts of said base having contours including a pair of horizontally disposed wells positioned to receive and nestingly support the transmitter and receiver ends of a handset when said handset is in a cradled position over said base, the lower part including said handhold disposed in an elongated horizontal position to engage said finger tips when a hand is positioned palm-up under the front edge of said lower part, said wells and said handhold forming cooperating contours on said base for retaining a handset in a cradled position despite tipping or rocking motion which may occur while said telephone is being moved by said finger tips.

4. The telephone of claim 3 and two hookswitch guides positioned in said upper part and between said wells, said hookswitch guides being in the form of two slides mounted for generally vertical travel in said upper part responsive to the weight of said handset and having a generally concave upper surface for guiding the handset to a position of minimum center of gravity.

5. A telephone subscriber set having a base with an elevated lower portion, said elevation being positioned to face a subscriber when the telephone set is in normal use, said elevation being sufficient to allow said subscriber to place his finger tips under said housing, and handhold means under said elevated portion positioned to engage the finger tips when so placed and thereby facilitate movement of said telephone, said base comprises a housing having two molded plastic pieceparts: one of said pieceparts being an upper part which supports a handset, encloses telephone set components, and presents an aesthetically pleasing appearance to the user: the other of said pieceparts being a lower part of a somewhat tray shape for supporting and locating the telephone components; and the lower edge of the upper part and the upper edge of the lower part having substantially the same contours so that said two parts may be secured together to make a complete housing.

6. The telephone set of claim 5 wherein the front edge of the lower part is shaped to provide said elevation by a distance selected on the physometric basis of a human hand in a palm-up, fingers slightly bent position, and said handhold comprises a horizontal slot positioned in said lower part beneath said front edge and oriented to engage the finger tips of said hand.

7. The telephone set of claim 6 wherein said lower part is so shaped to provide said elevation by sloping upwardly toward said front edge, said slope being inclined at an angle in the order of 30°–45° with respect to the bottom of said tray, and said slot being formed in the sloping panel of said lower molded piece part.

8. The telephone set of claim 7 and control means on said upper part positioned for engagement by the thumb of said hand when said finger tips are positioned in said slot.

9. A telephone subscriber set having a base with an elevated lower portion, said elevation being positioned to face a subscriber when the telephone set is in normal use, said elevation being sufficient to allow said subscriber to place his finger tips under said housing, and handhold means under said elevated portion positioned to engage the finger tips when so placed and thereby facilitate movements of said telephone, and control means above said elevated position located to engage a thumb when said finger tips are under said elevated portion.

References Cited

FOREIGN PATENTS 1,066,623 10/1959 Germany.

KATHLEEN H. CLAFFY, Primary Examiner

J. S. BLACK, Assistant Examiner